United States Patent
Perrault

(10) Patent No.: US 6,452,095 B1
(45) Date of Patent: Sep. 17, 2002

(54) THREADED CABLE HANGERS FOR SUPPORTING ELECTRICAL CABLES IN SHIPS

(76) Inventor: Raymond E. Perrault, 3845 Crest Rd., Rancho Palos Verdes, CA (US) 90274

( * ) Notice: Subject to any disclaimer, the term of this patent is extended or adjusted under 35 U.S.C. 154(b) by 0 days.

(21) Appl. No.: 08/845,619

(22) Filed: Apr. 25, 1997

(51) Int. Cl.$^7$ ................................................ H02G 7/00
(52) U.S. Cl. ................................ 174/40 R; 174/40 TD; 174/70 R; 248/49; 248/58; 248/61; 248/68.1
(58) Field of Search ......................... 174/40 R, 40 CC, 174/40 TD, 68.1, 68.3, 70 R, 70 C, 100; 248/49, 58, 61, 65, 68.1

(56) References Cited

U.S. PATENT DOCUMENTS

| | | | |
|---|---|---|---|
| 1,588,566 A | 6/1926 | Wismer | |
| 1,740,873 A | 12/1929 | Peirce, Jr. | |
| 3,497,033 A | 2/1970 | Herrenkohl | 182/92 |
| 3,576,305 A | * 4/1971 | Welsh et al. | 248/68 |
| 4,266,310 A | 5/1981 | Perrault et al. | |
| 4,382,416 A | 5/1983 | Kellogg-Smith | 114/90 |
| 4,960,253 A | 10/1990 | Perrault et al. | |
| 5,271,585 A | * 12/1993 | Zetena, Jr. | 248/49 |
| 5,320,439 A | 6/1994 | Perrault et al. | |
| 5,350,141 A | 9/1994 | Perrault et al. | |
| 5,794,897 A | * 8/1998 | Jobin et al. | 248/74.4 |
| 5,961,081 A | * 10/1999 | Rinderer | 248/68.1 |
| 6,040,525 A | * 3/2000 | Chauquet et al. | 174/40 CC |

* cited by examiner

Primary Examiner—Dean A. Reichard
Assistant Examiner—W. David Walkenhorst
(74) Attorney, Agent, or Firm—Christopher Darrow; Oppenheimer Wolff & Donnelly

(57) ABSTRACT

A threaded cable hanger attached to a stud includes a reverse (protuberant) dimple that provides a seat for the end of the stud, and permits the bar to make up to a full final turn to permit the bar to be in a desired orientation. A stud top containing the reverse dimple may be disposed across the path of the stud. The stud stop may slowly bend from a configuration extending toward the stud to a configuration extending away from the stud, during bending absorbing energy and resisting excessive torquing. A pair of overlapping arms may be provided, one of which is internally threaded to receive the stud and guide it toward the reverse dimple and stud stop. When a large external force attempts to pull the bar off the stud, or when torquing is extreme, the arms unfold and create a binding action on the stud.

16 Claims, 4 Drawing Sheets

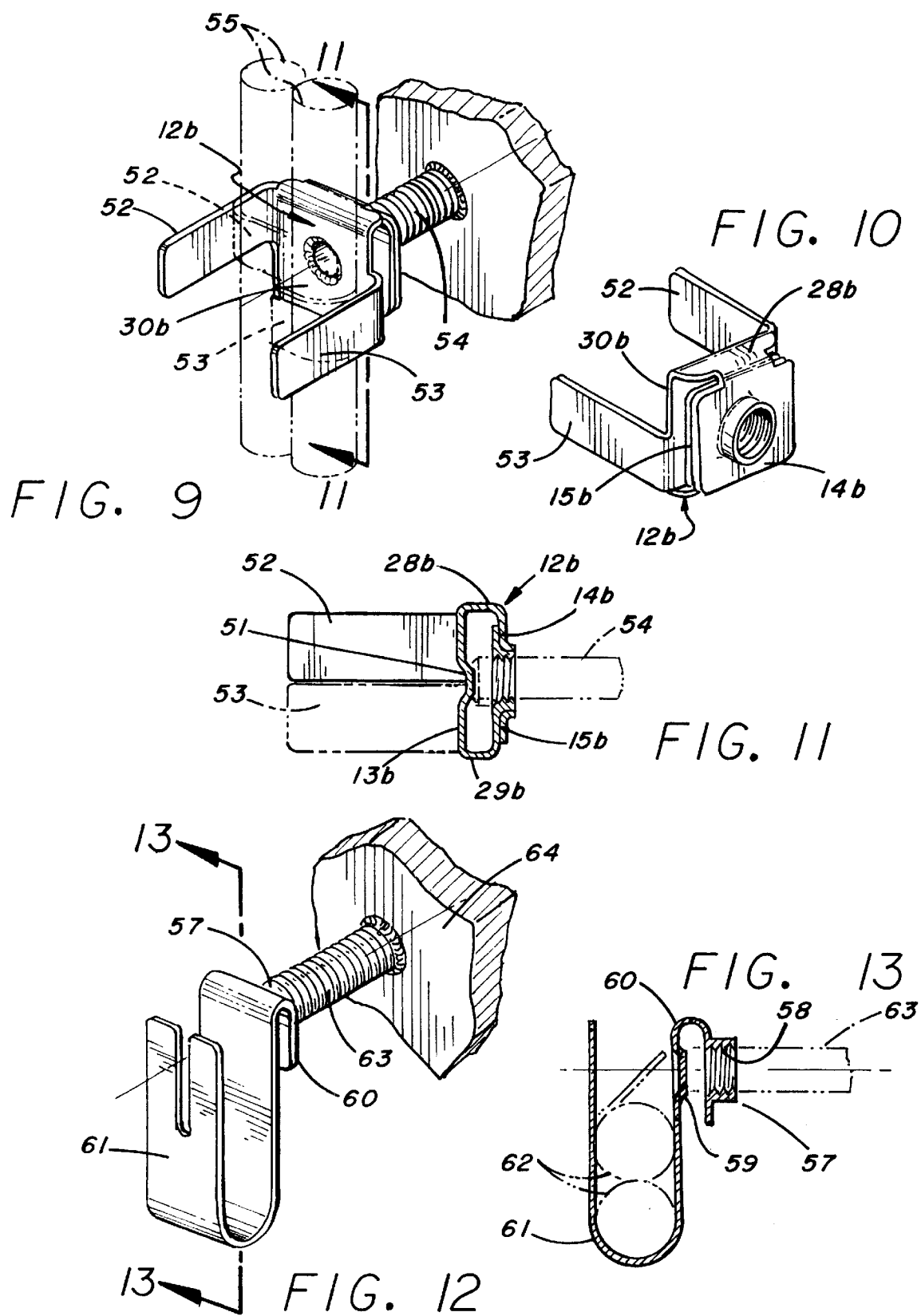

THREADED CABLE HANGERS FOR SUPPORTING ELECTRICAL CABLES IN SHIPS

BACKGROUND OF THE INVENTION

In the field of threaded cable hangers (cable-hanging metal bracket assemblies) for use in ships, and elsewhere, there are several factors that are of primary importance:

(a) that the electrical cables be hung effectively and strongly and permanently and easily, and in the desired locations and combinations;

(b) that the cost be low; and (c) that it be very difficult or impossible to wreck the cable hangers by over-zealous application of muscle while threading the cable hangers onto threaded supporting studs.

Relative to the above factor (a), it should be possible to merely weld threaded studs to the wall (bulkhead) or ceiling (overhead), thread the cable hangers onto the studs until they are properly and permanently seated and are in the right orientations, and connect the cables to the hangers. Then, the hangers should strongly support the cables for as long a time as desired.

Relative to factor (b), the cable hangers should be capable of being made on a punch-press of one piece of sheet metal. Because of the high cost of punch-press dies, a single configuration of hanger should be readily capable of very different cable-hanging applications.

Relative to factor (c) it is emphasized that the sizes and shapes of some cable hangers are such that very strong persons can apply huge forces to the mated threads at the surfaces of threaded studs. It would be very desirable if even stripping of the original threads of the cable hanger or stud did not permit the cable hanger to move off the stud.

SUMMARY OF THE INVENTION

In accordance with a first embodiment of the invention, which may be called a heavy duty T-bar cable hanger, a strong bar is so constructed that there are three ways of strongly and properly associating it with a threaded stud. One is a reverse (protuberant) dimple that provides a seat for the end of the stud, and that permits the bar to make up to a full final turn so as to tightly relate the bar to the stud and also permit the bar to be in a desired orientation.

The second way is a stud stop that is disposed across the path of the stud, and that contains the above-indicated reverse dimple. The stud stop is so associated with the remainder of the bar that it may slowly bend from a configuration extending toward the stud to a configuration extending away from the stud, during all of which bending it absorbs energy and resists excessive torquing.

The third way is a pair of overlapping arms one of which is internally threaded to receive the stud and guide it toward the reverse dimple and stud stop. When there is a very large external force attempting to pull the bar off the stud, or when the torquing is so extreme that not only is the stud stop pushed over center from one side to the other but the torquing is continued thereafter, the arms start to unfold and accordingly create a binding action on the stud. This binding action is so effective that it holds the bar on the stud even if the original threads are stripped. However, it is a feature that—despite the binding—the bar may when desired be intentionally removed from the stud by reversing the direction of torquing.

The above elements, especially the overlapping arms and the stud stop, perform plural functions. Thus, for example, the threaded one of the arms is the normal threaded element that receives the stud, even if there is (as often occurs) only enough torquing to collapse the reverse dimple and not bend the stud stop or cause the arms to unfold. As another example, the stud stop is defined between two parallel slots; these receive bands that support the cables.

In accordance with a second embodiment of the invention, the above-indicated T-bar cable hanger is quickly and cheaply adapted for inverted (hanging—vertical stud) T applications. This is done by punching out the reverse dimple to create a hole sufficiently large that the stud may freely pass through it. A male/female elongate standoff spacer is provided for double (or triple, etc.) decking of the bars. Then, a bar is threaded upwardly onto a depending vertical stud, at the threaded hole in one of the above-indicted arms. The standoff spacer is then threaded onto the stud below the bar. This is repeated for as many decks of bars as is desired. The cables are banded to the bars.

In accordance with third and fourth embodiments, separate bands for the cables are not employed. Instead, integral metal arms support the cables. In the third embodiment, additional metal arms extend from a short channel having the above-indicated overlapping arms one of which is threaded. In the fourth embodiment, a return-bent sheet metal strip is internally threaded on one side to receive the stud. The other side of the return-bent strip is provided with the dimple (as is the flange of the third embodiment indicated above). The return-bent element extends in U-shaped configuration such that cables (one or several) nest therein and are supported thereby.

BRIEF DESCRIPTION OF THE DRAWINGS

FIG. 9 is an isometric view of the third embodiment, showing in phantom two cables held by bent arms;

FIG. 10 is an isometric view showing the third embodiment from the other side;

FIG. 11 is a section on line 11—11 of FIG. 9;

FIG. 12 is an isometric view of the fourth embodiment; and

FIG. 13 is a section on line 13—13 of FIG. 12, and showing cables held by bent sheet metal.

DETAILED DESCRIPTION OF THE PREFERRED EMBODIMENTS

Figure 1:
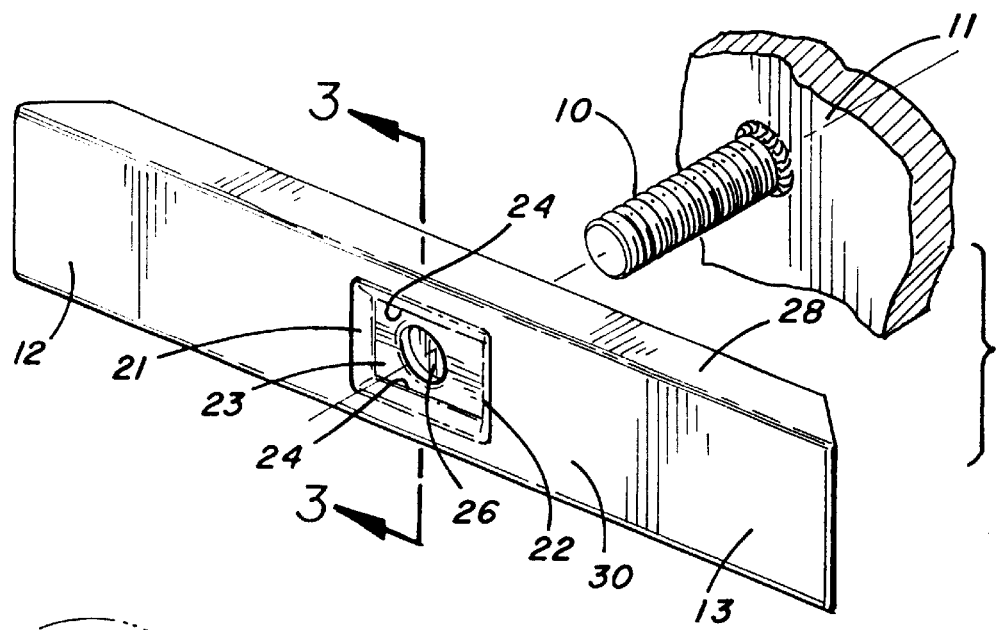
FIG. 1 is an isometric exploded view of the first embodiment, the bands and cables being unshown.

Referring to the first embodiment, a heavy duty T-bar cable hanger assembly, this is shown in FIGS. 1 through 5. The overlapped arms are also shown in isometric FIG. 6, top bar.

A threaded steel stud 10 is welded at one end to a wall (bulkhead) 11 of a ship or other construction (for example, a building). Typically, wall 11 is substantially vertical, and the stud, which is perpendicular to the wall, extends substantially horizontally.

An elongate cable-supporting bar 12 is threaded onto stud 10 so as to be supported thereby; the stud and bar combine to form a T-shape. Bar 12 has a channel-shaped body 13.

It is conventional for bar 12 to be threaded onto stud 10 for a desired number of turns and until bar 12 is horizontal as illustrated. It is not known what orientation bar 12 will be in when it first seats; thus, one benefit of the present invention is to permit bar 10 to be turned-after first seating-until the bar is not only horizontal but is tightly associated with the stud.

Without limitation, it is pointed out that the bar 12 nay have a length ranging from (for example) 1.5 inches to 7.5 inches. A typical width of the bar is about 1 inch. The bar is formed of strong but bendable sheet steel, either carbon steel or stainless steel.

Description of the Method of Manufacture

It is a feature of the invention that the T-bar cable hanger may be, and very preferably is, made out of a single piece of sheet steel, on a punch-press. Without limitation, a specific example is now given of how this is preferably accomplished. The particular example relates to the 7.5 inches long cable-supporting bar 12.

There is punched out of sheet steel stock a flat blank, not shown, that is an elongate rectangle 7.5 inches long and approximately 1⅝th inches wide. The end corners of the rectangle are cut off at approximately 45 degrees. The blank is not free, being held to a metal strip that moves through the press.

Provided at the central region of the blank, and lying in the same plane, are an outer arm and an inner arm. The arms are preferably exactly registered with each other; each has a dimension longitudinally of the blank of approximately 1.5 inches. Each arm projects outwardly approximately ⅞ inch.

While the entire blank, including the arms, is in the same plane, holes are punched in the arms and, furthermore, sheet metal surrounding each hole is bent outwardly.

The outwardly-bent sheet metal surrounding the hole in the outer arm is generally frustoconical; it is not threaded. The outwardly-bent sheet metal surrounding the hole in the inner arm is generally cylindrical.

The size relationships are caused to be such that, after the arms are bent and overlapped as described below, the cylindrical outward-bent sheet metal extends upwardly into the frustum of a cone.

The cylindrical sheet metal surrounding the hole in the inner arm is threaded at a later stage in the manufacturing process, as indicated below. It is sized and adapted to threadedly receive the threaded stud 10.

In the present specific example the hole in the outwardly-bent sheet metal cylinder in the inner arm is approximately ⅜ inch in diameter.

Proceeding further with a description of the steps that occur while the blank is in the same plane in the punch-press, two slots are formed in spaced relationship from each other and parallel to each other, each extending perpendicularly to the longitudinal axis of the blank. Each slot is approximately ¾ inch long and ⅛ inch wide. Pressing operations are then performed on the metal, which becomes the stud stop, between the slots. Such metal between the slots is pressed so as to be offset substantially from the main body of the sheet metal blank. There are crease lines that extend parallel to the blank; the metal between the crease lines is somewhat outwardly arcuate.

In addition, a dimple is formed in the under side of the stud stop, and this creates the above-indicated reverse dimple that extends outwardly and is subsequently engaged by an end of the stud.

Side flanges are bent upwardly from side regions of the flat blank so as to be perpendicular to the main body of the blank (this being the web of the channel-shaped body). In the present specific example, each side flange is approximately ⅜ inch high so that the web between the side flanges is approximately 1 inch wide.

The arms are bent and folded into parallel and overlapping relationship to each other, parallel to the web, with the outwardly-bent sheet metal cylinder extending upwardly into the hole defined within the outwardly-bent frustum of a cone.

The outwardly-bent cylinder is then tapped to form a thread that will threadedly receive the stud 10.

Accordingly, the cable-supporting bar 12 had been rapidly and strongly and cheaply made, in a punch-press, from a single piece of sheet metal, namely a unitary sheet metal blank punched from sheet metal stock.

Summary of the Construction of the Bar 12, Using Reference Numbers

Figure 6:
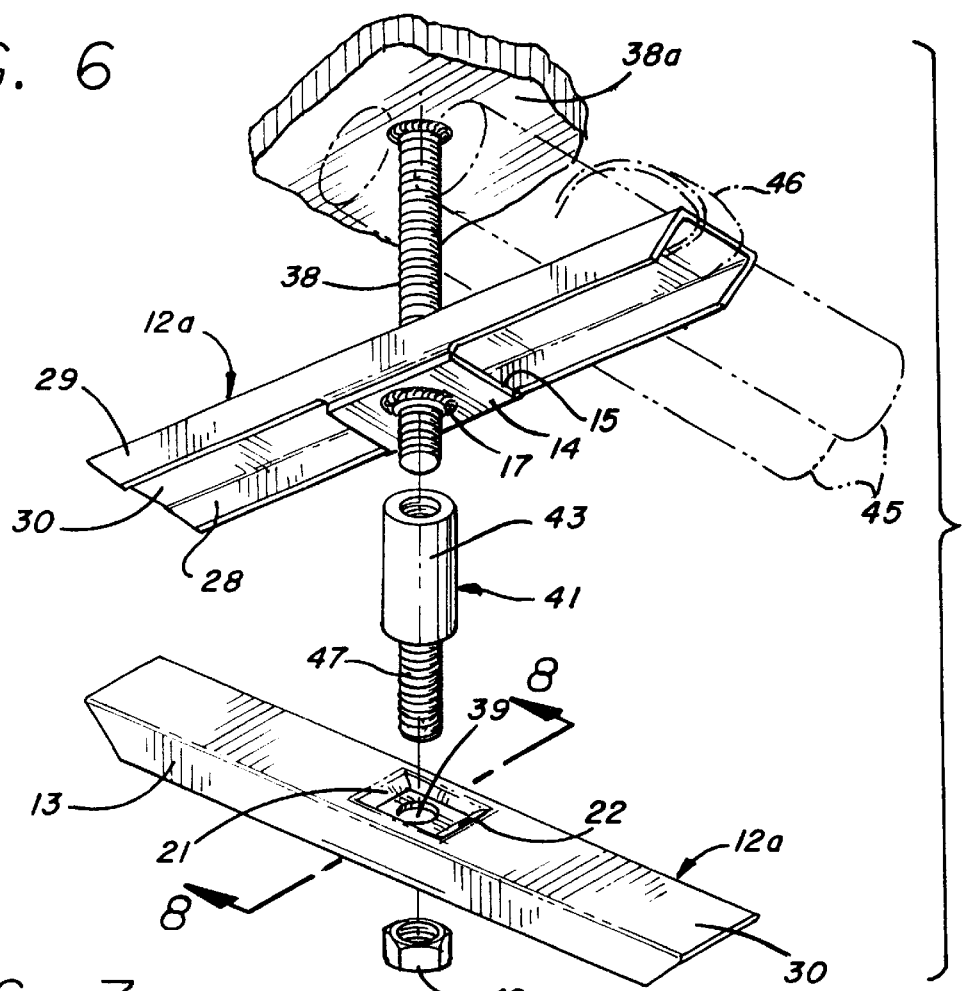
FIG. 6 is an isometric view, largely exploded, of the second embodiment.

The arms shown in FIG. 6 (which relates primarily to the second embodiment) are exactly the sane as the arms, of the first embodiment. Thus, the arm portions shown in FIG. 6 correspond exactly to the arm portions shown in FIG. 3. In these figures, and others, the outer arm is numbered 14 and the inner arm is numbered 15.

These arms are bent (folded) and overlapped as shown. They are not significantly connected to each other except through the channel flanges and web with which they are integral. By "significantly" is meant in such a way as to prevent movement of the arms relative to each other. Thus, for example, the arms are preferably not welded to each other.

The outwardly-bent frustum of a cone, surrounding the hole in outer arm 14, is numbered 17. The outwardly-bent cylinder, surrounding the hole in inner arm 15, is numbered 19. Cylinder 19 penetrates frustum 17, as shown in the drawings. There is close nesting, with consequent high-strength two-ply defining of the threaded hole.

Figure 3:
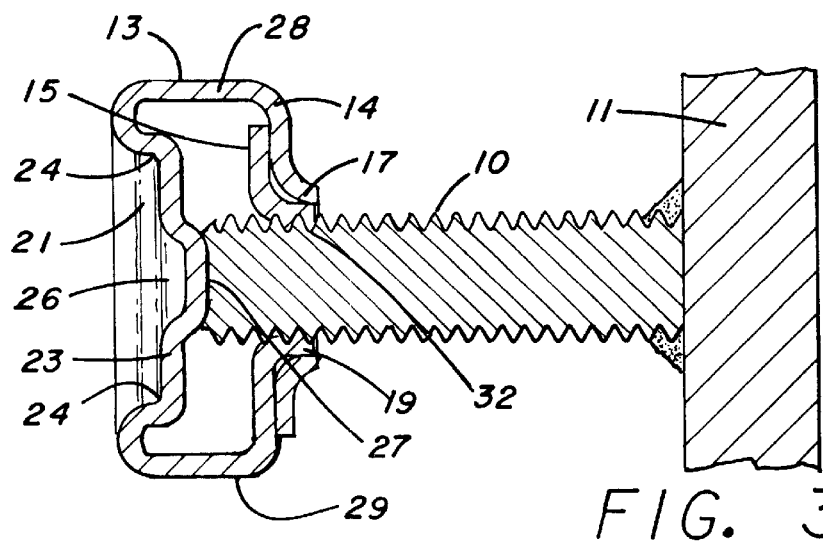
FIG. 3 is a section on line 3—3 of FIG. 1 but showing the stud threaded into contact with the reverse dimple, and showing (in section) the overlapped arms before excessive torque is applied.

The described slots are shown at 21,22 in FIGS. 1 and 3, prior to excessive torquing. Such slots define the stud stop 23. The crease lines at the longitudinal side edges of stud stop 23 are numbered 24 in FIGS. 1 and 3.

Numbers 26 and 27 indicate, respectively, the dimple and reverse dimple (FIGS. 1 and 3).

Description of Operation, and Further Description of Construction of the First Embodiment of the Invention Let it be assumed that the described cable-supporting bar 12 is threaded properly onto the stud 10 that has been welded to bulkhead 11 (FIG. 1). The person mounting the bar on the stud merely threads the integral threaded cylinder 19 onto stud 10 by rotating the bar. Rotation is continued until the end of the stud engages reverse dimple 27, which is protuberant toward bulkhead 11.

As soon as the stud end seats on the reverse dimple, the installer rotates the bar 12 for an additional turn or partial turn, until the bar is horizontal as shown. Furthermore, the pressure thus exerted between reverse dimple and stud creates a tightening action, somewhat in the nature of a lock washer, that prevents the bar from rotating on the stud unless the bar is intentionally turned.

Figure 2:
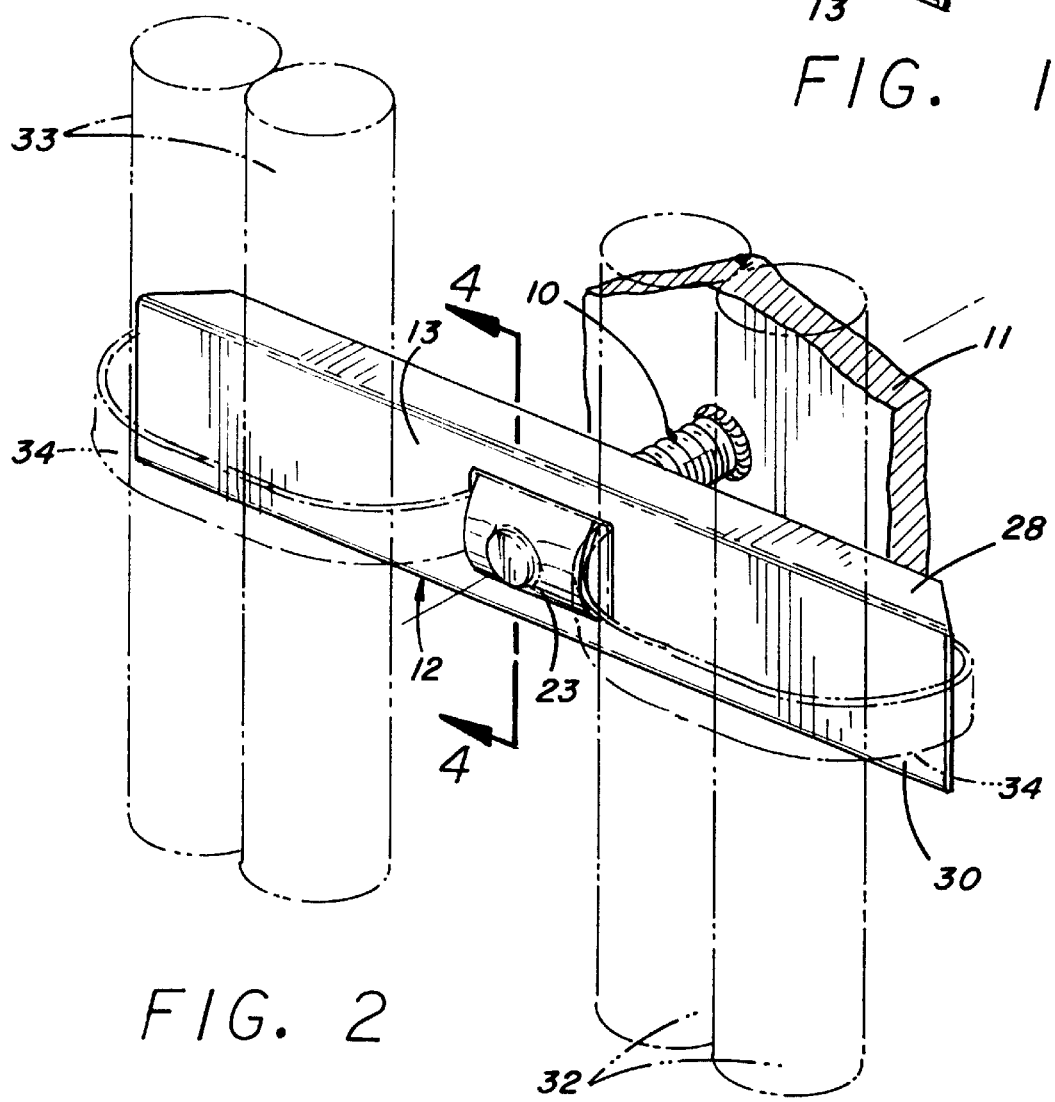
FIG. 2 corresponds to FIG. 1 but is an assembly view showing the bands and cables in phantom, and showing the stud stop pushed out by forceful threading.

Let it next be assumed that, as often occurs, the installer does not stop at the right time but instead continues rotating-often with a large amount of muscle applied. What happens then is that the reverse dimple is depressed and, furthermore, stud stop 23 is pushed by the stud in a direction away from the bulkhead. If carried to extreme, the stud stop 23 is pushed through the plane of web 30 of the channel-shaped bar 12 and is bent to the side of the bar remote from the bulkhead 11, as shown in FIG. 2. The stud stop nay be caused to extend away from the plane of web 30 as far "below" the web (away from the bulkhead) as it was originally "above" the web (toward the bulkhead). The reverse dimple is inverted-turned inside out (FIG. 2).

Figure 4:
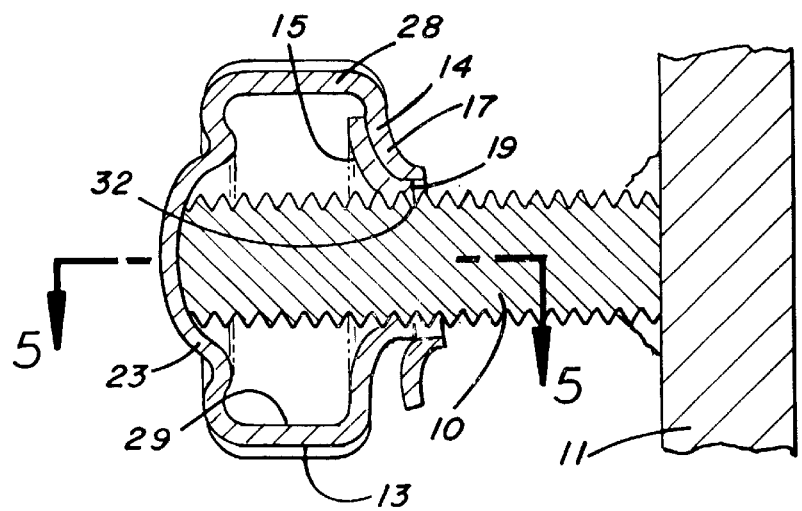
FIG. 4 is a section on line 4—4 of FIG. 2, showing bending and binding that result from application of excessive torque.
Figure 5:
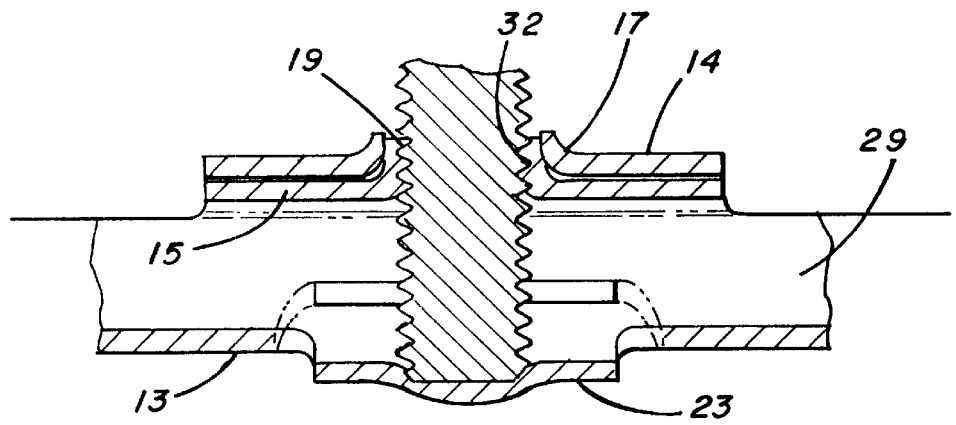
FIG. 5 is a section on line 5—5 of FIG. 4.

Let it next be assumed that there is a more extreme condition, such that the rotation is continued even after the stud stop 23 is pushed by the stud as far as the stud stop will go. This would normally strip the threads 32 of the outwardly-bent sheet metal cylinder 19, thereby destroying the integrity of the connection between stud and the cable-supporting bar 12. However, because of a further aspect of the invention the connection will be maintained even under such extreme conditions. What happens is that the additional turning of the bar 12 causes inner arm 15 to bend away from web 30. When the inner arm thus bends, it lifts the outer arm 14 (FIG. 4). This causes the holes in the outer and inner arms to no longer be fully registered with each other, but instead to become more and more out of registry with each other. In other words, there is a binding action created, the strength of the binding action increasing in accordance with the magnitude of the turning action.

Even if the original threads 32 strip, this binding action is such that additional threads can be cut in response to the binding and turning.

It follows that in substantially all events short of actual breaking of the stud 10, the stud and cable-supporting bar 12 will remain assembled with each other regardless of excessive torquing performed by the operator who installs the bar on the stud.

(It is also emphasized that even a direct pulling force, unrelated to turning or installation, is resisted by the overlapping arms 14,15 so that there is a very strong action securing the cable-supporting bar to the stud and thus to the bulkhead 11.)

The electrical cables 33 (FIG. 2) are then readily installed onto the bar 12 by use of synthetic resin (or other) bands 34. These bands are extended through the slots 21,22 in web 30, so that these slots have a double function. The bands are secured by suitable buckle or fastening arrangements (not shown) known in the art.

The inner portions of the bands extend between channel flanges 28,29, and thus are held in position by the flanges as well as by the edges defining the slots. As shown, the bands extend around the ends of the web. The channel flanges thus not only add strength, but aid in mounting the bands.

If at any time it is desired to remove the cables and bar, the cables are first dismounted, following which the bar 12 is removed by merely rotating it in the opposite direction from which it was installed. It has been found that the bar will normally rotate off the stud even after the above-described binding action has occurred.

Figure 7:
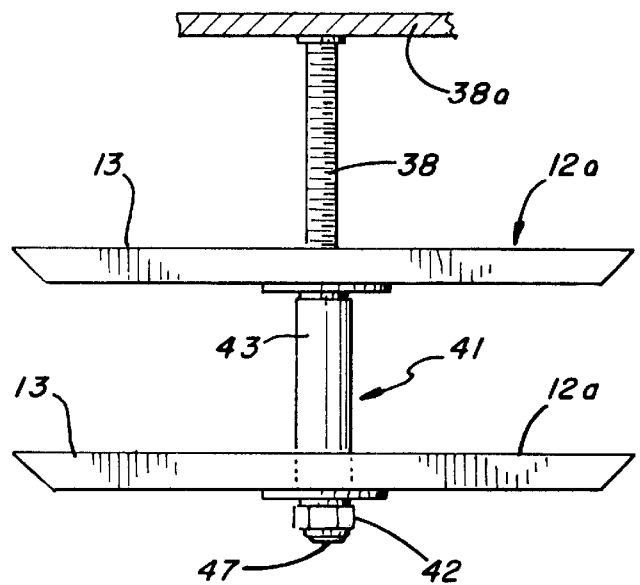
FIG. 7 is a side elevation of the second embodiment when fully assembled, but with cables unshown.
Figure 8:
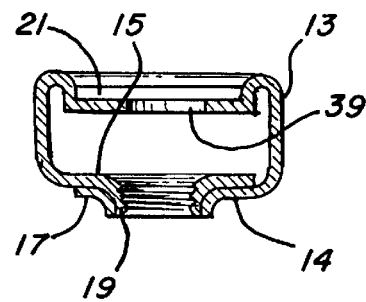
FIG. 8 is a section on line 8—8 of FIG. 6.

Description of the Second Embodiment of the Invention, Namely, a T-bar Cable Hanger for Inverted T applications Referring to FIGS. 6 through 8, a (frequently) long threaded stud 38 is welded at its upper end to an overhead 38a in a ship, or to a ceiling in a building, etc. Then, a cable-supporting bar that corresponds exactly to the one described relative to the previous embodiment, with one salient exception, is provided. Such bar is numbered 12a and has the reverse-dimple 27 and surrounding region punched out (or drilled out) to such a diameter as to just provide clearance for the associated stud 38, there being no threading. Thus, stated otherwise, a clearance hole 39 is formed by the punching-out that permits free movement of stud 38 therethrough without any threading action, but lateral support is provided by the circular edge of the hole. The cable-supporting bar 12a is used in conjunction with one or two other parts. The first is an elongate male/female standoff spacer 41 (FIG. 6). The other is a common nut 42. The spacer and nut are sized and threaded correspondingly to stud 38.

In the operation of the present embodiment, a first cable-supporting bar 12a is moved up around the lower end of stud 38, with the stud passing freely (but with no slop) through the indicated clearance hole 39—such clearance hole being uppermost when the bar 12a is oriented as illustrated in FIGS. 6 and 7. Such upward movement is continued until the lower end of stud 38 reaches the internally threaded hole in the outwardly-bent cylindrical portion 19.

Then, the bar 12a is rotated about the vertical axis to thread it upwardly onto the lower end portion of the stud 38. After a desired amount of such threading, creating a strong connection, the internally-threaded tubular upper portion 43 of the standoff spacer 41 is threaded upwardly onto the lower end of stud 38 and is tightly seated against the outwardly-bent frustum region 17 surrounding the hole in outer arm 14. This firmly holds the bar 12a in a desired angular position.

Cables 45 are then mounted on the upper side of the bar 12a by means of associated bands 46 corresponding to bands 34 previously referred to. This can be done on one or both sides of the stud, namely the right side as shown in FIG. 6 (where cables are illustrated) and the left side therein (where cables are not now illustrated but where they can be present). The flanges 28,29 help support the cables.

Then, assuming it is desired to hang more cables, an additional (lower) bar 12a is moved upwardly around the downwardly projecting lower male end of standoff spacer 41, this being numbered 47. During the first part of the upward movement, the male end 47 moves freely (with no slop) through the clearance hole 39; thereafter it is necessary to rotate the bar 12a about a horizontal axis in order to thread the male end 47 into the internally threaded hole in the outwardly-bent cylinder 19.

Additional cables (not shown) are then banded to the bar. This procedure is repeated relative to a desired number of bars, there being two bars illustrated in FIGS. 6 and 7. Below the lowermost bar is mounted the nut 42.

The several bars 12a are caused to be parallel to each other as illustrated, and resist undesired rotation.

It is pointed out that the clearance hole 39, that is to say the metal surrounding the clearance hole, acts as a guide and torque-resisting means which strengthens the association between the stud and the bar.

Instead of using the standoff spacers 41, it is possible to provide all of the bars on a single elongate stud, and then provide a nut below each bar to serve as a locking means. In each case, the nut is tightened against the bottom surface of the outwardly-bent sheet metal 17.

Description of the Third Embodiment of the Invention, Employing Integral Metal Arms Instead of Separate Bands Referring to FIGS. 9–11, there is illustrated at 12b a short cable-supporting bar which corresponds somewhat to the bar 12 with the important exception that there is (in the illustrated form) no stud stop 23. Instead, the reverse dimple (indicated at 51 in FIG. 11) is formed in the web 30*b* of the short channel, there being no slots. The channel flanges are shown at 128*b*,29*b*.

Offset elongate arms 52,53 extend outwardly from the ends of the channel web 30*b*. These arms are bent by the installer so as to bend around the cables in place of the previously described bands 34 and 46.

In the operation of the third embodiment, a threaded stud 54 is welded onto a vertical (normally) wall or bulkhead, and the threaded outwardly-bent sheet metal cylinder is threaded onto the end of such stud. Threading is continued until the reverse dimple 51 is engaged by the stud end. Further threading is then effected in order to tighten the connection and achieve the desired orientation of the bar. Cables 55 are thus supported by the arms 52,53 which are wrapped around them.

When the torquing is excessive, so that the reverse dimple 51 is fully collapsed and bent to a region where it can no longer bend further, additional (undesired) threading causes the overlapping arms (shown at 14*b*,15*b*) to start to unfold and create the above-described binding action. Thus, the cable hanger has great strength against excessive torque during mounting, and also against pulling forces applied from external sources.

Description of the Fourth Embodiment of the Invention

In accordance with the fourth embodiment, an elongate strip of sheet metal, is provided, in a punch press, with a hole around which sheet metal is outwardly bent in generally cylindrical relationship, to form cylinder 57. Th is cylinder is tapped so as to form internal thread 58.

Also in the press, a reverse dimple 59 is formed in such location that it will be directly opposite the internally-threaded cylinder when an end portion of the blank is return-bent into the U-shaped (hairpin-shaped) configuration 60 shown at the upper-right in FIG. 13.

The remainder of the blank is bent into a much larger U-shaped configuration 61 so as to receive one or more (for example two or three) cables 62 one on top of another.

In operation, a stud 63 is welded to a bulkhead 64 and projects horizontally therefrom. The described cable hanger is threaded onto the stud until the reverse dimple 59 is engaged and partially collapsed. Thus, there is a tight relationship between the stud and the cable hanger, and the large U-shaped portion 61 of the cable hanger is caused to be in the desired orientation which is normally the one illustrated. Cables 62 are then mounted in U-shaped portion 61.

The upper-outer end of the large U-shaped cable-receiving portion 61 is vertically split, as shown, in order to facilitate bending thereof around the cable so as to lock them in place.

The foregoing detailed description is to be clearly understood as given by way of illustration and example only, the spirit and scope of this invention being limited solely by the appended claims.

What is claimed is:

1. An assembly for hanging cables in ships and elsewhere, which comprises:
    (a) a threaded stud, one end of which is adapted to be secured to a wall or bulkhead,
    (b) a first section of sheet metal,
        said first section having an internally threaded opening therein,
            said stud being threadedly received in said opening in response to rotation of said first section about the axis of said opening,
    (c) a second section of sheet metal fixedly connected to said first section thereof,
        said second section being generally parallel to said first section and being spaced therefrom, said second section having a part thereof directly opposite said opening,
        said second section having a dimple at said part thereof directly opposite said opening,
            said dimple being on the side of said second section remote from said opening whereby a reverse dimple is present on the side of said second section facing said opening, said reverse dimple being protuberant toward the distal end of said stud and being progressively engaged by said distal end in response to conjoint rotation of said first and second sections about said axis of said opening to cause threaded receiving of said stud in said opening, said dimple creating a tight relationship between said stud and said first and second sections, and permitting conjoint rotation of said first and second sections until they are in desired positions, and
    (d) means to secure cable to at least one of said sections to cause supporting of said cable.

2. The invention as claimed in claim 1, in which said securing means is a third section of sheet metal that is spaced from said second section and that cooperates with said second section in receiving cable between the second and third sections.

3. The invention as claimed in claim 1, in which said securing means is a band that extends through a hole in said first section.

4. The invention as claimed in claim 1, in which said first and second sections of sheet metal are integral with each other, having been stamped conjointly from a single unitary piece of sheet metal.

5. The invention as claimed in claim 4, in which said first section is formed into a substantially cylindrical shape around said opening.

6. A high-strength low-cost hanger for cables, which comprises:
    (a) a threaded stud one end of which is adapted to be secured to a wall or bulkhead,
    (b) a substantially channel-shaped element formed of sheet metal, said channel-shaped element having a web and opposed flanges,
    (c) an arm connected to each of said flanges,
        said arms overlapping each other and being generally parallel to said web,
        said arms having openings therethrough registered with each other,
            one of said openings being internally threaded to receive said stud in threadedly-connected relationship, and
    (d) means to connect said channel-shaped element to a cable whereby said cable is supported by said stud and by said channel-shaped element,
    (e) said arms are not connected to each other, except through said flanges and web, so that bending of said flanges in a direction away from said web causes said openings to become out of registry with each other so that the metal of said arms surrounding said openings binds against said stud and strongly grips the same, (f) only one of said openings is threaded, being the opening in said arm that is nearest said web, the other of said openings being a clearance opening, (g) said web, at the region opposite said openings, is a stud stop, said stud stop being a section of said web between spaced and generally parallel slots that are formed through said web, said web section between said slots being protuberant toward said stud.

7. The invention as claimed in claim 6, in which said means to connect said channel shaped element to a cable is at least one band extended through an opening in said web.

8. The invention as claimed in claim 7, in which said means to connect said channel-shaped element to a cable is at least one arm integral with said web and adapted to be bent around said cable.

9. The invention as claimed in claim 6, in which said stud stop has a reverse dimple formed therein and is protuberant towards said openings.

10. A cable hanger, which comprises:

(a) a metal element having an opening therein that is internally threaded to receive a threaded stud, (b) a stud stop connected to said metal element and disposed opposite and spaced from said opening,
Said stud stop being defined by generally parallel slots, said stud stop being bendable in response to being engaged and forced by said stud, (c) a threaded stud threaded into said opening and engaged at its end with said stud stop, and (d) means to secure a cable to said metal element for support of said cable.

11. The invention as claimed in claim 10, in which said metal element and said stud stop are sheet metal elements connected to each other, the sheet metal forming said stud stop being protuberant toward said opening and being adapted to be bent by said stud until protuberant away from said opening.

12. The invention as claimed in claim 11, in which a reverse dimple is formed in said sheet metal forming said stud stop, said dimple being opposite said opening and protuberant toward said opening.

13. A cable hanger adapted to be associated either with a stud projecting from a bulkhead, or a stud hanging from an overhead, which comprises:

(a) an elongate sheet metal channel, said channel having a web and flanges, and (b) arm means extending between said flanges generally parallel to and spaced from said web,
said arm means having a threaded opening therethrough adapted to threadedly receive a threaded stud,
said web having means thereon for association with band means to secure at least one cable to said channel, (c) said web has a stud stop thereon opposite said threaded opening, said stud stop being a section of said web defined between parallel slots in said web.

14. The invention as claimed in claim 13, in which said web has a clearance opening therethrough adapted to receive said stud in close-fitting but not threaded relationship, and in which nut means are mounted on said stud and engaged with said web.

15. The invention as claimed in claim 14, in which the part of said web having said clearance opening therethrough is between two parallel slots in said web, said slots being said means for association with band means.

16. The invention as claimed in claim 14, in which said nut means is part of an elongate threaded male-female spacer.

* * * * *